(12) United States Patent
Sadlik et al.

(10) Patent No.: US 10,386,547 B2
(45) Date of Patent: Aug. 20, 2019

(54) TEXTURED HIGH REFRACTIVE INDEX SURFACE FOR REFLECTIVE IMAGE DISPLAYS

(71) Applicant: CLEARink Displays, Inc., Fremont, CA (US)

(72) Inventors: Bram M. Sadlik, Vancouver (CA); Rob Hannebauer, Vancouver (CA); Thomas Johansson, Coquitlam (CA); Steven Gou, Vancouver (CA)

(73) Assignee: CLEARink Displays, Inc., Fremont, CA (US)

( * ) Notice: Subject to any disclaimer, the term of this patent is extended or adjusted under 35 U.S.C. 154(b) by 0 days.

(21) Appl. No.: 15/368,849

(22) Filed: Dec. 5, 2016

(65) Prior Publication Data

US 2017/0160444 A1    Jun. 8, 2017

Related U.S. Application Data (60) Provisional application No. 62/263,654, filed on Dec. 6, 2015.

(51) Int. Cl.
```
G02F 1/01     (2006.01)
G02B 5/02     (2006.01)
G02F 1/167    (2019.01)
```
(52) U.S. Cl.
CPC ........... *G02B 5/0231* (2013.01); *G02F 1/167* (2013.01); *G02F 2201/34* (2013.01)

(58) Field of Classification Search
CPC ............ G02F 1/167; G02F 2001/1672; G02F 2001/1674; G02F 2001/1676; G02F 2001/1678; G02F 2201/34; G02F 1/172; G02F 1/1671; G02F 1/1675; G02F 1/16753; G02F 1/16755; G02F 1/16756;
(Continued)

(56) References Cited

U.S. PATENT DOCUMENTS 3,792,308 A    2/1974 Ota et al.
3,919,031 A   11/1975 White
(Continued)

FOREIGN PATENT DOCUMENTS

AT    333109 T    8/2006
CA   2292441 C    7/2002
(Continued)

OTHER PUBLICATIONS

Gou, S. et al., "Transparent Superhydrophobic Surfaces for Applications of Controlled Reflectance" Applied Optics vol. 51, Issue No. 11, Apr. 10, 2012, pp. 1645-1653.
(Continued)

*Primary Examiner* — William R Alexander
*Assistant Examiner* — Henry A Duong
(74) *Attorney, Agent, or Firm* — Dianoosh Salehi (57) ABSTRACT

A textured surface on the inward side of the high refractive index transparent front sheet in a reflective image display may lead to a display with a wider viewing angle. The textured surface may be in a random or a patterned array and may comprise microstructures that exhibit total internal reflection and Fresnel reflections. Electrophoretically mobile particles of similar size to the microstructures may improve coverage on the front sheet and improve frustration of TIR leading to darker dark states.

10 Claims, 5 Drawing Sheets

(58) Field of Classification Search
CPC .. G02F 1/16757; G02F 1/1677; G02F 1/1679; G02F 1/1681; G02F 1/1685; G02F 1/1676; G02B 5/0231; G02B 26/026
USPC .......................................................... 359/296
See application file for complete search history.

(56) References Cited

U.S. PATENT DOCUMENTS

| | | | |
|---|---|---|---|
| 4,025,674 | A | 5/1977 | Mizuochi |
| 4,071,430 | A | 1/1978 | Liebert |
| 4,203,106 | A | 5/1980 | Dalisa et al. |
| 4,648,956 | A | 3/1987 | Marhsall et al. |
| 4,821,092 | A | 4/1989 | Noguchi |
| 5,019,748 | A | 5/1991 | Appelberg |
| 5,319,491 | A | 6/1994 | Selbrede |
| 5,359,346 | A | 10/1994 | Disanto |
| 5,396,350 | A | 3/1995 | Beeson et al. |
| 5,596,671 | A | 1/1997 | Rockwell, III |
| 5,717,283 | A | 2/1998 | Biegelsen et al. |
| 5,871,653 | A | 2/1999 | Ling |
| 5,959,777 | A | 9/1999 | Whitehead |
| 5,999,307 | A | 12/1999 | Whitehead et al. |
| 6,064,784 | A | 5/2000 | Whitehead et al. |
| 6,215,920 | B1* | 4/2001 | Whitehead .............. G02B 26/02 349/63 |
| 6,304,365 | B1* | 10/2001 | Whitehead .............. G02B 5/045 359/222.1 |
| 6,376,828 | B1 | 4/2002 | Comiskey |
| 6,377,383 | B1 | 4/2002 | Whitehead et al. |
| 6,384,979 | B1 | 5/2002 | Whitehead et al. |
| 6,437,921 | B1 | 8/2002 | Whitehead |
| 6,452,734 | B1 | 9/2002 | Whitehead et al. |
| 6,532,048 | B1 | 3/2003 | Matsui |
| 6,574,025 | B2 | 6/2003 | Whitehead et al. |
| 6,751,008 | B2 | 6/2004 | Liang et al. |
| 6,787,976 | B2 | 9/2004 | Minoura et al. |
| 6,822,783 | B2 | 11/2004 | Matsuda et al. |
| 6,842,279 | B2 | 1/2005 | Amundson |
| 6,863,414 | B2 | 3/2005 | Ho |
| 6,865,011 | B2 | 3/2005 | Whitehead et al. |
| 6,885,496 | B2 | 4/2005 | Whitehead et al. |
| 6,891,658 | B2 | 5/2005 | Whitehead et al. |
| 6,975,455 | B1 | 12/2005 | Kotchick et al. |
| 7,046,439 | B2 | 5/2006 | Kaminsky et al. |
| 7,093,968 | B2 | 8/2006 | Hsueh et al. |
| 7,164,536 | B2 | 1/2007 | Whitehead |
| 7,170,670 | B2 | 1/2007 | Webber |
| 7,259,744 | B2 | 8/2007 | Arango et al. |
| 7,286,280 | B2 | 10/2007 | Whitehead et al. |
| 7,324,263 | B2 | 1/2008 | Johnson et al. |
| 7,422,964 | B2 | 9/2008 | Akiyama |
| 7,439,948 | B2 | 10/2008 | Johnson et al. |
| 7,454,103 | B2 | 11/2008 | Parriaux |
| 7,463,398 | B2 | 12/2008 | Feenstra |
| 7,507,012 | B2 | 3/2009 | Aylward et al. |
| 7,515,326 | B2 | 4/2009 | Ibrede et al. |
| 7,564,614 | B2 | 7/2009 | Chen et al. |
| 7,660,509 | B2 | 2/2010 | Bryan et al. |
| 7,740,387 | B2 | 6/2010 | Schultz et al. |
| 7,760,417 | B2 | 7/2010 | Whitehead |
| 7,775,700 | B2 | 8/2010 | Lee |
| 7,852,430 | B1 | 12/2010 | Gettmey |
| 7,940,457 | B2 | 5/2011 | Jain et al. |
| 8,022,615 | B2 | 9/2011 | Bai et al. |
| 8,040,591 | B2 | 10/2011 | Whitehead |
| 8,094,364 | B2 | 1/2012 | Park |
| 8,179,034 | B2 | 5/2012 | Potts et al. |
| 8,384,659 | B2 | 2/2013 | Yeo et al. |
| 8,587,512 | B2 | 11/2013 | Hiji et al. |
| 8,648,772 | B2 | 2/2014 | Hebenstreit et al. |
| 8,690,408 | B2 | 4/2014 | Li |
| 9,360,696 | B1 | 6/2016 | Ghali et al. |
| 9,377,574 | B2 | 6/2016 | Li |
| 9,612,501 | B2 | 4/2017 | Whitehead |
| 2001/0004275 | A1 | 6/2001 | Umemoto et al. |
| 2002/0063963 | A1 | 5/2002 | Whitehead et al. |
| 2002/0089735 | A1 | 7/2002 | Albert et al. |
| 2002/0140884 | A1 | 10/2002 | Richard |
| 2002/0171910 | A1 | 11/2002 | Pullen et al. |
| 2003/0038755 | A1* | 2/2003 | Amundson .............. G02F 1/167 345/15 |
| 2003/0067666 | A1 | 4/2003 | Kawai |
| 2003/0165016 | A1 | 9/2003 | Whitehead et al. |
| 2003/0179327 | A1 | 9/2003 | Nonaka et al. |
| 2003/0214697 | A1 | 11/2003 | Duthaler et al. |
| 2004/0085496 | A1 | 5/2004 | Paukshto et al. |
| 2004/0136047 | A1 | 7/2004 | Whitehead et al. |
| 2004/0160551 | A1 | 8/2004 | Wang et al. |
| 2004/0174584 | A1 | 9/2004 | Whitehead et al. |
| 2004/0177237 | A1 | 9/2004 | Huppenthal et al. |
| 2004/0179145 | A1 | 9/2004 | Jacobsen et al. |
| 2004/0239613 | A1 | 12/2004 | Kishi |
| 2005/0007000 | A1 | 1/2005 | Chou et al. |
| 2005/0068287 | A1 | 3/2005 | Lin et al. |
| 2005/0270439 | A1 | 12/2005 | Weber et al. |
| 2006/0056009 | A1 | 3/2006 | Kombrekke et al. |
| 2006/0148262 | A1 | 7/2006 | Lee et al. |
| 2006/0170330 | A1 | 8/2006 | Disanto et al. |
| 2006/0209010 | A1 | 9/2006 | Ding et al. |
| 2006/0209418 | A1 | 9/2006 | Whitehead |
| 2006/0291034 | A1 | 12/2006 | Patry et al. |
| 2007/0008739 | A1 | 1/2007 | Kim et al. |
| 2007/0019434 | A1 | 1/2007 | Lee |
| 2007/0046623 | A1* | 3/2007 | Song ....................... G02F 1/167 345/107 |
| 2007/0047003 | A1 | 3/2007 | Suwabe |
| 2007/0091434 | A1 | 4/2007 | Garner et al. |
| 2007/0195231 | A1 | 8/2007 | Kuribayashi et al. |
| 2007/0195391 | A1 | 9/2007 | Nishikawa et al. |
| 2007/0247573 | A1 | 10/2007 | Ouderkirk et al. |
| 2007/0263137 | A1 | 11/2007 | Shigeta et al. |
| 2007/0263291 | A1 | 11/2007 | Whitehead |
| 2008/0002247 | A1 | 1/2008 | Nagato et al. |
| 2008/0024432 | A1 | 1/2008 | Lee et al. |
| 2008/0030661 | A1 | 2/2008 | Tung et al. |
| 2008/0043184 | A1 | 2/2008 | Tung et al. |
| 2008/0174852 | A1 | 7/2008 | Hirai et al. |
| 2008/0203910 | A1 | 8/2008 | Reynolds |
| 2008/0204854 | A1 | 8/2008 | Whitehead et al. |
| 2008/0218845 | A1 | 9/2008 | Marakami |
| 2008/0219024 | A1 | 9/2008 | Mi et al. |
| 2008/0231960 | A1 | 9/2008 | Van Gorkom et al. |
| 2008/0266245 | A1 | 10/2008 | Wilcox |
| 2008/0266646 | A1 | 10/2008 | Wilcox et al. |
| 2008/0285282 | A1 | 11/2008 | Karman et al. |
| 2008/0297496 | A1 | 12/2008 | Watson et al. |
| 2008/0303994 | A1 | 12/2008 | Jeng et al. |
| 2008/0304134 | A1 | 12/2008 | Ban |
| 2009/0096745 | A1 | 4/2009 | Sprague et al. |
| 2009/0109172 | A1 | 4/2009 | Lee et al. |
| 2009/0141221 | A1 | 6/2009 | Taguchi et al. |
| 2009/0201565 | A1 | 8/2009 | Bita et al. |
| 2009/0201570 | A1 | 8/2009 | Frazier et al. |
| 2009/0207476 | A1 | 8/2009 | Yanagisawa et al. |
| 2009/0225398 | A1 | 9/2009 | Duthaler et al. |
| 2009/0231714 | A1 | 9/2009 | Zhao et al. |
| 2009/0244935 | A1 | 10/2009 | Hsieh et al. |
| 2009/0256810 | A1 | 10/2009 | Pasquariello |
| 2009/0262083 | A1 | 10/2009 | Parekh |
| 2009/0262414 | A1 | 10/2009 | Whitehead |
| 2009/0273746 | A1 | 11/2009 | Uehara et al. |
| 2009/0322669 | A1 | 12/2009 | Bryning et al. |
| 2010/0079843 | A1 | 4/2010 | Derichs et al. |
| 2010/0085627 | A1 | 4/2010 | Whitehead |
| 2010/0091224 | A1 | 4/2010 | Cho et al. |
| 2010/0118383 | A1 | 5/2010 | Van Abeelen et al. |
| 2010/0148385 | A1 | 6/2010 | Balko et al. |
| 2010/0172016 | A1 | 7/2010 | Park et al. |
| 2010/0225575 | A1 | 9/2010 | Ishii et al. |
| 2010/0245375 | A1 | 9/2010 | Rhodes |
| 2010/0253711 | A1 | 10/2010 | Muroi |
| 2011/0007381 | A1 | 1/2011 | Paolini, Jr. et al. |
| 2011/0032460 | A1 | 2/2011 | Lee et al. |
| 2011/0043435 | A1 | 2/2011 | Hebenstreit et al. |

(56) References Cited

U.S. PATENT DOCUMENTS

| | | |
|---|---|---|
| 2011/0051054 A1 | 3/2011 | Wang et al. |
| 2011/0085116 A1 | 4/2011 | Kim |
| 2011/0085232 A1 | 4/2011 | Werner et al. |
| 2011/0273906 A1 | 10/2011 | Nichol et al. |
| 2011/0279442 A1 | 11/2011 | Hage et al. |
| 2011/0299014 A1 | 12/2011 | Jang et al. |
| 2011/0304902 A1 | 12/2011 | Yeo et al. |
| 2011/0310465 A1 | 12/2011 | Takanashi |
| 2011/0316764 A1 | 12/2011 | Parry-Jones et al. |
| 2012/0008203 A1 | 1/2012 | Ijzerman et al. |
| 2012/0019896 A1 | 1/2012 | Yoshida et al. |
| 2012/0019899 A1 | 1/2012 | Yeo |
| 2012/0026576 A1 | 2/2012 | Bita et al. |
| 2012/0062981 A1 | 3/2012 | Komatsu et al. |
| 2012/0069064 A1 | 3/2012 | Yamakita |
| 2012/0081777 A1 | 4/2012 | Heikenfeld et al. |
| 2012/0113367 A1 | 5/2012 | Kitson et al. |
| 2012/0113499 A1 | 5/2012 | Komatsu |
| 2012/0262496 A1 | 10/2012 | Swic |
| 2012/0281430 A1 | 11/2012 | Huang et al. |
| 2012/0287380 A1 | 11/2012 | Hagiwara et al. |
| 2012/0293857 A1 | 11/2012 | Kwon et al. |
| 2013/0050806 A1 | 2/2013 | Yasui et al. |
| 2013/0077284 A1 | 3/2013 | Chang et al. |
| 2013/0135320 A1 | 5/2013 | Govil |
| 2013/0155723 A1 | 6/2013 | Coleman |
| 2013/0182311 A1 | 7/2013 | Mochizuki et al. |
| 2013/0278995 A1 | 10/2013 | Drzaic et al. |
| 2013/0334972 A1 | 12/2013 | Atkins |
| 2014/0049448 A1 | 2/2014 | Christensen |
| 2014/0063586 A1 | 3/2014 | Jung et al. |
| 2014/0160185 A1 | 6/2014 | Okuno et al. |
| 2014/0333989 A1 | 11/2014 | Whitehead |
| 2014/0340376 A1 | 11/2014 | Itagaki et al. |
| 2015/0146273 A1 | 5/2015 | Whitehead |
| 2015/0234250 A1 | 8/2015 | Lin et al. |
| 2016/0026061 A1* | 1/2016 | O'Keeffe ............... G02F 1/167 359/296 |
| 2016/0097961 A1 | 4/2016 | Whitehead |
| 2016/0116815 A1 | 4/2016 | Whitehead |
| 2016/0139478 A1 | 5/2016 | Whitehead |
| 2016/0147128 A1 | 5/2016 | Loxley et al. |
| 2016/0155399 A1 | 6/2016 | Tripathi et al. |
| 2016/0216561 A1 | 7/2016 | Lee et al. |
| 2016/0231475 A1 | 8/2016 | Whitehead |
| 2016/0246155 A1 | 8/2016 | Loxley et al. |
| 2016/0274435 A1 | 9/2016 | Whitehead |
| 2016/0349592 A1 | 12/2016 | Goulding et al. |
| 2016/0363811 A1 | 12/2016 | Zhong et al. |
| 2016/0377950 A1 | 12/2016 | Zhang |
| 2017/0068145 A1* | 3/2017 | Nakamura ............. G02F 1/167 |
| 2017/0075184 A1 | 3/2017 | Low et al. |
| 2017/0160448 A1 | 6/2017 | Whitehead |
| 2017/0160620 A1 | 6/2017 | Whitehead |
| 2017/0287406 A1 | 10/2017 | Whitehead |
| 2017/0299935 A1 | 10/2017 | Whitehead |
| 2018/0017838 A1 | 1/2018 | Thomas |
| 2018/0031941 A1 | 2/2018 | Goulding |
| 2018/0157144 A1 | 6/2018 | Sadlik |
| 2018/0173074 A1 | 6/2018 | Zhang |

FOREIGN PATENT DOCUMENTS

| | | |
|---|---|---|
| CA | 2371138 C | 7/2005 |
| CA | 2410955 C | 1/2007 |
| CA | 2474384 C | 8/2010 |
| CA | 2643808 C | 8/2013 |
| CN | 1308734 A | 8/2001 |
| CN | 1173208 C | 10/2004 |
| CN | 1639625 A | 7/2005 |
| CN | 101160547 A | 4/2008 |
| CN | 1454327 A | 9/2008 |
| CN | 102955318 A | 3/2013 |
| CN | 103207495 A | 7/2013 |
| CN | 108957898 A | 12/2018 |
| DE | 69825894 | 9/2005 |
| EP | 1118039 | 2/2003 |
| EP | 0988573 B1 | 8/2004 |
| EP | 1290486 B1 | 10/2004 |
| EP | 1368700 B1 | 7/2006 |
| JP | 3965115 | 6/2007 |
| JP | 2007279641 | 10/2007 |
| JP | 4113843 | 4/2008 |
| JP | 4956610 | 3/2012 |
| KR | 100949412 | 3/2010 |
| TW | 201024886 A | 7/2010 |
| WO | 2003075085 | 9/2003 |
| WO | 2005010604 | 2/2005 |
| WO | 2006108285 | 10/2006 |
| WO | 2006114743 | 11/2006 |
| WO | 2008103554 A1 | 8/2008 |
| WO | 2012021121 A1 | 2/2012 |
| WO | 2014092729 A1 | 6/2014 |
| WO | 2014146937 | 9/2014 |
| WO | 2014160552 A1 | 10/2014 |
| WO | 2014189751 A1 | 11/2014 |
| WO | 2015005899 A2 | 1/2015 |
| WO | 2015061538 A1 | 4/2015 |
| WO | 2015116913 | 8/2015 |
| WO | 2015175518 | 11/2015 |
| WO | 2016057613 A1 | 4/2016 |
| WO | 2016085835 A1 | 6/2016 |
| WO | 2016109273 A1 | 7/2016 |
| WO | 2016130720 | 8/2016 |
| WO | 2007072355 A2 | 6/2017 |
| WO | 2017100157 A1 | 6/2017 |
| WO | 2017105443 A1 | 6/2017 |
| WO | 2017147449 A1 | 8/2017 |
| WO | 2017205312 A1 | 11/2017 |
| WO | 2017214396 A1 | 12/2017 |
| WO | 2017040628 A1 | 3/2018 |

OTHER PUBLICATIONS

Whitehead, L. et al., "The Many Roles of Illumination in Information Display" Society for Information Display Symposium (Invited Paper), Issue No. 0097-966X/06/3701-0000, May 2010.

Wong, R. et al., "Electrochemical Threshold Conditions During Electro-Optical Switching of Ionic Electrophoretic Optical Devices" Applied Optics vol. 48, Issue No. 6, Feb. 20, 2009, pp. 1062-1072.

Whitehead, L. et al., "Reflections on Total Internal Reflection" Optics and Photonics News Feb. 2009, pp. 28-34.

Mossman, M. et al., "Observations of Total Internal Reflection at a Natural Super-Hydrophobic Surface" Physics in Canada vol. 64, Issue No. 1, Mar. 2008, pp. 7-11.

Hrudey, P. et al., "Application of Transparent Nanostructured Electrodes for Modulation of Total Internal Reflection" SPIE 2007 Conference Paper No. 6647 Aug. 2007, pp. 1-12.

Hrudey, P. et al., "Variable Diffraction Gratings Using Nanoporous Electrodes and Electrophoresis of Dye Ions" SPIE 2007 Conference Paper No. 6645 Aug. 2007, pp. 1-12.

Webster, A. et al., "Control of Reflection at an Optical Interface in the Absence of Total Internal Reflection for a Retroreflective Display Application" Applied Optics vol. 45, Issue No. 6, Feb. 20, 2006, pp. 1169-1176.

Mossman, M. et al., "Off the Beaten Path with Total Internal Reflection" International Optical Design Conference (Invited Paper), Jun. 2006, pp. 1-12.

Whitehead, L. et al., "Total Internal Reflection for Illumination and Displays" SPIE Newsroom Sep. 7-8, 2006.

Mossman, M. et al., "Controlled Frustration of TIR by Electrophoresis of Pigment Particles" Applied Optics vol. 44, Issue No. 9, Mar. 20, 2005, pp. 1601-1609.

Kwong, V. et al., "Control of Reflectance of Liquid Droplets by Means of Electrowetting" Applied Optics vol. 43, Issue No. 4, Feb. 1, 2004, pp. 808-813.

Mossman, M. et al. "A High Reflectance, Wide Viewing Angle Reflective Display Using Total Internal Reflection in Mirco- (56) References Cited

OTHER PUBLICATIONS

Hemispheres" International Display Research Conference, Issue No. 1083-1312/00/2003-0233, Sep. 2003, pp. 233-236.
Mossman, M. et al., "Grey Scale Control of Total Internal Reflection Using Electrophoresis of Sub-Optical Pigment Particles" International Conference of the Society for Information Display, Boston, MA Issue No. 2-0966X/02/3301-0522, May 2002, pp. 522-525.
Coope, R. et al., "Modulation of Retroreflection by Controlled Frustration of Total Internal Reflection" Applied Optics vol. 41, Issue No. 25, Sep. 1, 2002, pp. 5357-5361.
Mossman, M. et al., "New Method for Maintaining Long Term Image Quality in a TIR Based Electrophoretic Display" International Display Research Conference, Nice, France, EURODISPLAY Oct. 2002, pp. 851-854.
Mossman, M. et al., "New Reflective Color Display Technique Based on Total Internal Reflection and Subtractive Color Filtering" International Conference of the Society for Information Display, San Jose, CA Issue No. 1-0966X/1/3201-1054, Jun. 2001, pp. 1054-1057.
Whitehead, L. et al., "Visual Applications of Total Internal Reflection in Prismatic Microstructures" Physics in Canada Nov./Dec. 2001, pp. 329-335.
Mossman, M. et al., "A New Reflective Display Based on Total Internal Reflection in Prismatic Microstructures" Proceedings of the 2000 Society for Information Display, International Display Research Conference, Issue No. 1083-1312/00/2001-0311, Oct. 2000, pp. 311-314.
Mossman et al. "Brightness Enhancement in TIR-Modulated Electrophoretic Reflective Image Displays", (Biblio).
Atsuhito et al. "Electrophoresis Device, Method of Manufacturing the Electrophoresis Device, Display, Display Substrate, and Electronic Unit", (Abstract).

Kambe, N. et al., "Refractive Index Engineering of nano-Polymer Composites," Symposium, Apr. 20, 2001, 6 pages, Materials Research Society Symposium Proceedings, Pittsburgh, PA.
International Search Report and Written Opinion dated Jul. 8, 2014 for PCT Application No. PCT/US2013/049606.
International Search Report and Written Opinion dated Dec. 30, 2014 for PCT Application No. PCT/US2014/058118.
International Search Report and Written Opinion dated Aug. 11, 2014 for PCT Application No. PCT/US2014/030966.
International Search Report and Written Opinion dated Sep. 19, 2014 for PCT Application No. PCT/US2014/038091.
International Search Report and Written Opinion dated Oct. 1, 2015 for PCT Application No. PCT/US2015/030349.
International Search Report and Written Opinion dated Apr. 3, 2015 for PCT Application No. PCT/US2014/061911.
International Search Report and Written Opinion dated Mar. 1, 2016 for PCT Application No. PCT/US2015/013725.
International Search Report and Written Opinion dated Jan. 27, 2016 for PCT Application No. PCT/US2015/054385.
International Search Report and Written Opinion dated Mar. 2, 2016 for PCT Application No. PCT/US2015/062075.
International Search Report and Written Opinion dated Apr. 13, 2016 for PCT Application No. PCT/US2015/066980.
International Search Report and Written Opinion dated Apr. 21, 2016 for PCT Application No. PCT/US2016/017416.
International Search Report and Written Opinion dated Mar. 28, 2016 for PCT Application No. PCT/US2015/066150.
Mossman, M. A. et al., "A Novel Reflective Image Display Using Total Internal Reflection" Displays Devices, DEMPA Publications, Tokyo JP vol. 25, No. 5 Dec. 1, 2004 pp. 215-221.
Robben, B. et al., "Electrodynamics of Electronic Paper Based on Total Internal Reflection," Journal, Sep. 20, 2018, pp. 034041-1-034041-11, DOI 10.1103/PhysRevApplied.10.034041, Americal Physical Society.

* cited by examiner

TEXTURED HIGH REFRACTIVE INDEX SURFACE FOR REFLECTIVE IMAGE DISPLAYS

The disclosure claims priority to the filing date of U.S. Provisional Application No. 62/263,654, filed on Dec. 6, 2015, the specification of which is incorporated herein in its entirety.

FIELD

The disclosure is directed to reflective image displays. In one embodiment, the disclosure relates to a wide viewing angle reflective image display comprising a textured inward surface of the front sheet.

BACKGROUND

Conventional total internal reflection (TIR) based displays include a transparent high refractive index front sheet in contact with a lower refractive index fluid. The front sheet and fluid have different refractive indices that may be characterized by a critical angle. The front sheet may be designed such that when light rays are incident upon the interface of the high refractive index front sheet and low refractive index fluid at angles less than the critical angle, they may be transmitted through the interface. When light rays are incident upon the interface at angles greater than the critical angle they may undergo TIR at the interface. A small critical angle is preferred at the TIR interface since this may afford a large range of angles over which TIR may occur. Fresnel reflections may also be present.

Conventional TIR-based reflective image displays further include electrophoretically mobile, light absorbing particles. When particles are moved by a voltage bias source to the surface of the front sheet they may enter the evanescent wave region and frustrate TIR. Incident light may be absorbed to create a dark state observed by the viewer. When the particles are moved out of the evanescent wave region, light may be reflected by TIR. This may create a white state that may be observed by the viewer. An array of pixelated electrodes may be used to drive the particles into and out of the evanescent wave region to form combinations of white and dark states. This may be used to create images to convey information to the viewer.

A high refractive index front sheet in conventional TIR-based displays further comprises an array of regularly spaced structures on the inward side facing the low refractive index medium and electrophoretically mobile particles. The array of regularly spaced structures may allow for TIR at their surface when incident light is greater than the critical angle. Light may be reflected in a semi-retro-reflective manner (semi-retro-reflective light may be described as light emitted from a display surface that follows a path less than about 30° from the typical incident ray path). In some applications it may be preferred that light is reflected in a more diffuse manner.

BRIEF DESCRIPTION OF DRAWINGS

These and other embodiments of the disclosure will be discussed with reference to the following exemplary and non-limiting illustrations, in which like elements are numbered similarly, and where.

DETAILED DESCRIPTION

The exemplary embodiments disclosed herein provide a reflective image display with diffuse reflectance. In an exemplary embodiment, the disclosure provides a transparent front sheet with a textured surface. The textured surface may be positioned inwardly relative to the viewer. In certain embodiments, the textured surface includes an array of microstructures created by, for example, one or more of embossing, chemical etching, electrochemical etching, plasma etching or physical abrasion. Each microstructure may define a convex or concave protrusion which extends out sharply towards or away from the front sheet. The microstructures may be randomly positioned on the surface or they may be regularly spaced. In one embodiment, the microstructures form a repeating pattern. In another embodiment, the microstructures form jagged peaks and valleys. In still other embodiments, the peaks are about 50-200 nm long. In some embodiments, the microstructures are about 50-200 nm wide. The shape and placement of the microstructures may ensure adequate light diffusion from the display.

The shape and placement of the microstructures may further allow the use of high refractive materials not suitable for conventional micro-molding techniques. Incident light rays may be totally internally reflected and scattered off of multiple facets in the bright state in a random manner, resulting in a diffuse reflection rather than semi-retro-reflective reflection. A textured surface (i.e., microstructures) may increase the likelihood of Fresnel reflections and scattering. Electrophoretically mobile particles may be used that are of similar size to that of the size of the structures on the textured inward surface. For example, electrophoretically mobile particles of at least about 100 nanometers may be able to pack efficiently into similarly sized structures on the textured inward surface to frustrate TIR. It should be noted that these nanometer-sized structures may be large enough to interact with the light.

Figure 1A:
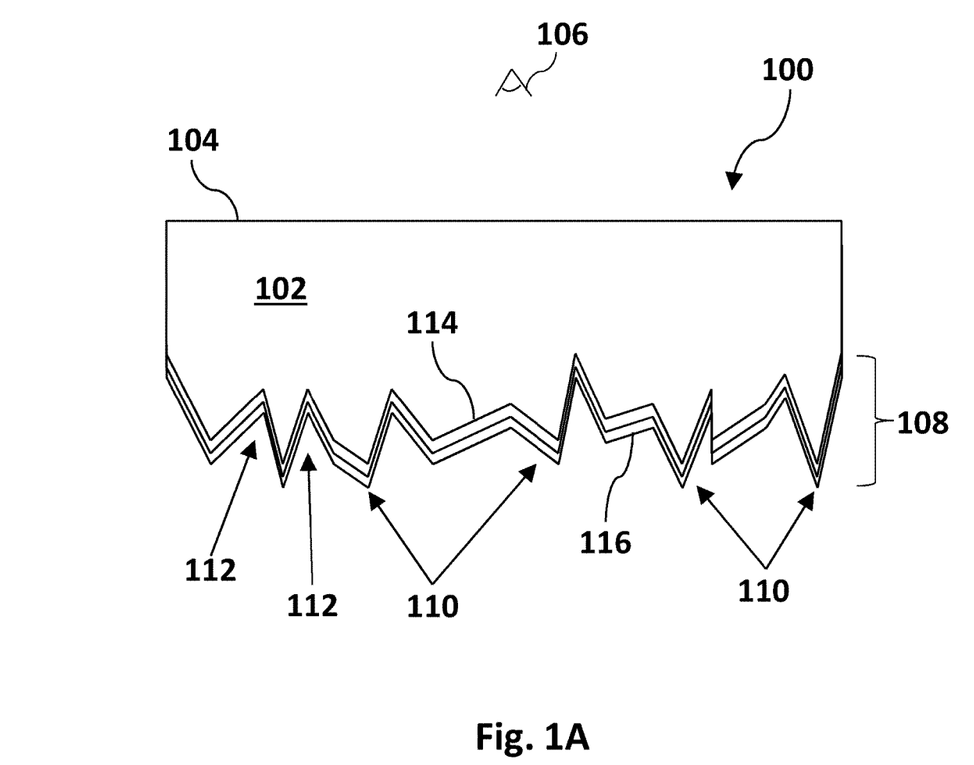
FIG. 1A is a schematic illustration of a front sheet of a TIR image display comprising a textured surface according to one embodiment of the disclosure.

FIG. 1A is a schematic illustration of a front sheet of a TIR image display comprising a textured surface according to one embodiment of the disclosure. In FIG. 1A, front sheet 100 may include a transparent high refractive index material 102 with an outward surface 104 facing viewer 106. In some embodiments, sheet 100 may have a refractive index of at least about 1.5. In an exemplary embodiment, sheet 100 may have a refractive index in the range of about 1.55-2.4.

Sheet 100 may comprise a polymer or glass or a combination of a polymer and glass. Sheet 100 may further include an inorganic additive such as a metal oxide. In some embodiments sheet 100 may comprise one or more particles selected from $ZrO_2$, $ZrO$, $ZnO$, $ZnO_2$, $ZnS$, $TiO_2$ or diamond or other material with a refractive index of about 1.7-2.5. In some embodiments the high refractive index particles may have a diameter of about 400 nm or less. In other embodiments, the particles may have a diameter of about 250 nm or less. Sheet 100 may comprise an inward textured surface. The surface may be textured in one or more of a random or in an organized (e.g., repeating pattern) manner. The textured surface may comprise a plurality of microstructures 108. The plurality of microstructures 108 may further comprise a combination of convex microstructures 110 and concave microstructures 112. Structures 110 and 112 may be arranged in one or more of a random or an organized array. The length of the convex structures 110 may be in a range of about 50-200 nm. The opening of the width of the concave structures 112 may be about 50-200 nm. In other embodiments the length of the structures and the opening of the width of the concave structures may be in the range of about 80-160 nm. In one embodiment, at least some of the convex microstructures 110 are about 100 nm in depth as measured in the perpendicular direction to the outward surface 104 of the front sheet. In one embodiment, the width of the concave structure is about 100 nanometers wide. The textured surface may be formed, among other techniques, by one or more of embossing, molding, chemical etching, electrochemical etching, plasma etching or physical abrasion.

Sheet 100 may further comprise a transparent front electrode 114 on the inward surface on the plurality of microstructures 108. In an exemplary embodiment the transparent front electrode is a conformal coating on the surface of the microstructures 108. The transparent front electrode 114 may comprise one or more of indium tin oxide (ITO), an electrically conducting polymer or metallic nanoparticles, such as aluminum, dispersed in a clear polymer matrix.

Sheet 100 may further include dielectric layer 116. The dielectric layer may optionally be used. The dielectric layer 116 may be located on the electrode layer 114. Dielectric layer 116 may be used as a protective layer for the electrode layer 114. In an exemplary embodiment, the dielectric layer 116 may also define a substantially conformal coating and may include either no pin holes or at least one pin hole. Dielectric layer 116 may be a polymer or a combination of polymers. In an exemplary embodiment dielectric layer 116 comprises parylene. Dielectric layer 116 may be a polymer such as a halogenated parylene or a polyimide. Dielectric layer 116 may be a glass such as $SiO_2$ or other metal oxide inorganic layer. In some embodiments, dielectric layer 116 may be a combination of a polymer and a glass.

Figure 1B:
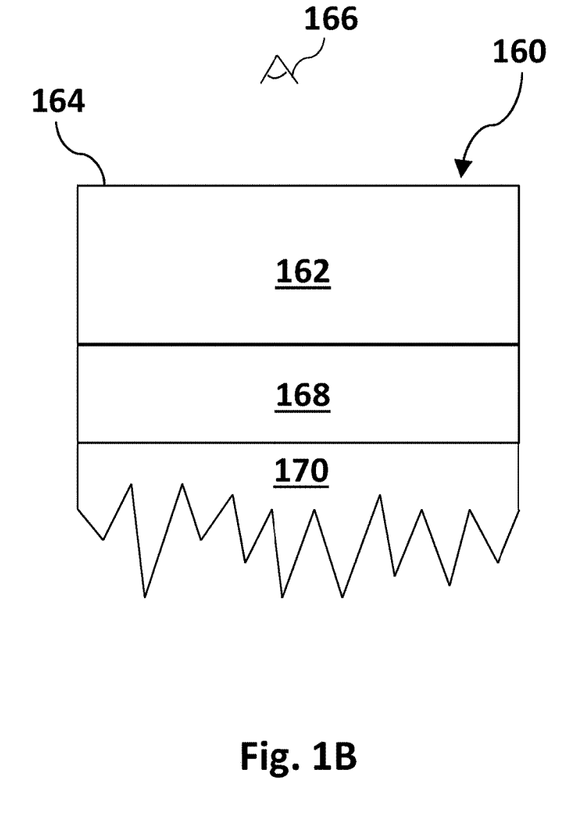
FIG. 1B is a schematic illustration of a front sheet of a TIR image display comprising a textured surface according to one embodiment of the disclosure.

FIG. 1B is a schematic illustration of a front sheet of a TIR image display comprising a textured surface according to one embodiment of the disclosure. The dielectric layer may also be a structured layer. Microstructures may be incorporated into the surface of the dielectric layer. The microstructures can be about the same thickness as the dielectric layer. That is, the dielectric layer may be constructed to have a flat surface facing the front electrode and a textured surface facing rear electrode. In FIG. 1B, front sheet 160 includes a transparent material 162 with an outward surface 164 facing viewer 166. Front sheet may further include an electrode layer 168 and a structured dielectric layer 170.

In other embodiments, sheet 100 may comprise glass with a layer of high index particles on the inward surface. The surface of the glass may be smooth or a randomly textured surface. The high index particles may have a refractive index of about 1.7-2.5. The high index particles may comprise one or more of a metal oxide, metal sulphide or other similar material such as one or more selected from $ZrO_2$, $ZrO$, $ZnO$, $ZnS$, $ZnO_2$, $TiO_2$, or diamond. The particles may be sputtered onto the surface of the glass to form a randomly textured surface. In some embodiments sheet 100 may further comprise one or more layers of an electrically conductive material such as ITO or a dielectric material on top of the layer of high index particles.

In other embodiments, sheet 100 may comprise a first layer of glass or other transparent material, a second layer of a polymer and a third layer of high refractive index particles of refractive index of about 1.7-2.5. The layer of polymer may be substantially smooth or substantially roughened or textured in a random manner. The multiple layers may further comprise a transparent electrically conductive layer such as ITO. In some embodiments the layers may further comprise a dielectric layer.

Figure 2A:
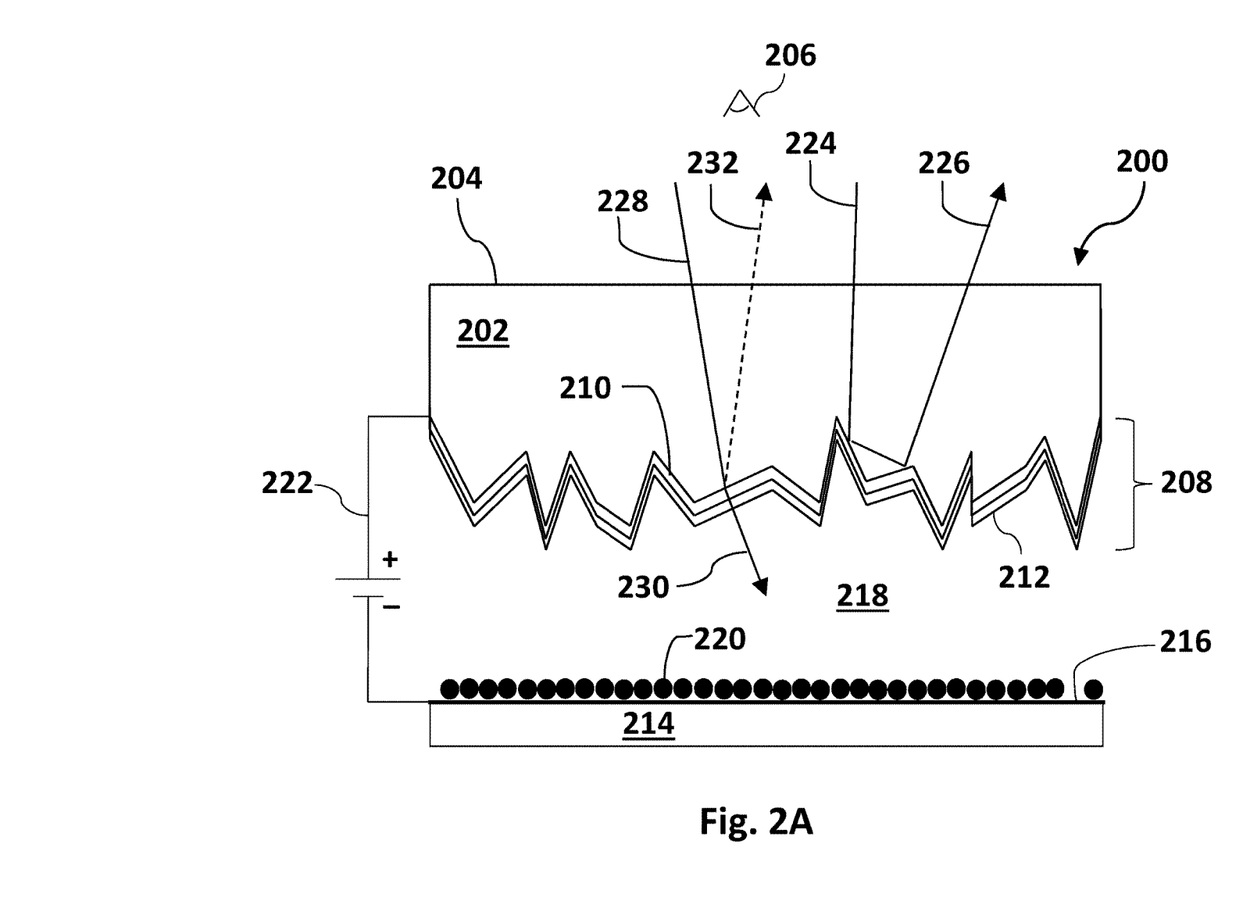
FIG. 2A is a schematic illustration of a TIR image display in the bright state having a textured front sheet.

FIG. 2A is a schematic illustration of a TIR image display in the bright state having a front sheet comprising a textured inward surface. In FIG. 2A, display 200 comprises a transparent front sheet 202 with an outward surface 204 facing viewer 206. Transparent front sheet 202 may include an inward textured surface (i.e., having microstructures). In the embodiment of FIG. 2A, the textured surface includes a plurality of microstructures 208. Microstructures 208 may further comprise a combination of convex and concave microstructures or protrusions in a random or regularly patterned array. In certain embodiments, the depth of the convex structures may be at least about 100 nanometers. In certain embodiments, the width of the concave structures may be at least about 100 nanometers.

Display 200 in FIG. 2A further comprises a transparent front electrode 210 on the inward surface on the plurality of microstructures 208. In an exemplary embodiment the transparent front electrode is a conformal coating on the surface of the microstructures 208. The transparent front electrode 210 may comprise one or more of indium tin oxide (ITO), an electrically conducting polymer or metallic nanoparticles, such as aluminum, in a clear polymer matrix.

Display 200 may further comprise an optional dielectric layer 212. Dielectric layer 212 may be located on the electrode layer 210. Dielectric layer 210 may be used as a protective layer for the electrode layer 210. Dielectric layer 212 may be a conformal coating and may comprise no pin holes or at least one pin hole. The dielectric layer may also be a structured layer. That is, the dielectric layer may be constructed to have a fat surface facing the front electrode and a textured surface facing rear electrode 216. Structures 208 may be incorporated into the surface of dielectric layer 212 when the microstructures are about the same thickness as the dielectric layer 212. Dielectric layer 212 may be a polymer or a combination of polymers. In an exemplary embodiment dielectric layer 212 comprises parylene. Dielectric layer 212 may be a polymer such as a halogenated parylene or a polyimide. Dielectric layer 212 may be a glass such as $SiO_2$ or other metal oxide inorganic layer. Dielectric layer 212 may be a combination of a polymer and a glass.

Display 200 is also shown with rear support layer 214 which further includes rear electrode layer 216. Rear electrode 216 may be located on the inward side of support layer 214. Rear electrode 216 and dielectric layer 212 form a gap therebetween. The gap may be filled with medium 218 and may receive mobile particles 220 as further described below. In an exemplary embodiment, rear electrode layer 216 may comprise a thin film transistor (TFT) array. In another embodiment, rear electrode layer 216 may comprise a patterned direct drive array of electrodes. Rear electrode layer 216 may also comprise a passive matrix array of electrodes. In an exemplary embodiment, rear electrode 216 may be overlaid with an optional dielectric layer (not shown).

FIG. 2 shows medium 218 substantially filling the gap formed between rear electrode 216 and dielectric layer 212. Medium 218 may be any fluidic medium including liquid or gaseous material. In certain embodiments medium 218 may have a refractive index of about 1-1.5. Medium 218 may be a halogenated liquid such as a fluorinated liquid. Medium 218 may be one or more of a hydrocarbon or a fluorinated hydrocarbon.

Display 200 may further comprise a plurality of electrophoretically mobile particles 220 suspended within medium 218. Particles 220 may absorb or reflect light. Particles 220 may comprise one or more of a dye, carbon black or a metal oxide-based pigment. Particles 220 may comprise an inorganic and an organic component. One or more particles 220 may move when an external bias is applied. Particles 220 may be charged positively or negatively. In certain applications, movable particles 220 may have a combination of positive and negative charges.

In other embodiments, particles 220 and medium 218 in display 200 may be replaced by an electrofluidic system (may also be referred to as an electrowetting system). The electrofluidic system may be used to modulate the light absorption and reflection instead of electrophoretically mobile particles 220. The electrofluidic system may comprise a polar fluid and a non-polar fluid. The fluids may comprise a negative or positive polarity or charge. In an exemplary embodiment, one fluid may comprise a color while the other fluid may be transparent. In an exemplary embodiment the transparent fluid may have a low refractive index in the range of about 1-1.5. The transparent fluid may comprise a hydrocarbon or a halogenated hydrocarbon. In other embodiments both fluids may comprise a color. The non-polar fluid may comprise silicon oil, alkane oil, solvent mixture of silicon oil or solvent mixture of alkane oil. In some embodiments the difference between the refractive index of the polar fluid and the refractive index of the non-polar fluid may be in the range of about 0.05 to about 1.5. A bias may be applied at the front electrode 210 of display 200 of opposite charge as the charge of the colored fluid. The colored fluid may then be attracted to the front electrode 210. In this position the colored fluid may absorb incident light creating a dark state. If a bias of opposite polarity of the colored fluid is applied at the rear electrode layer 216, the colored fluid may be attracted to rear electrode 216. Incident light rays may be reflected towards viewer 206 by total internal reflection creating a bright state of the display.

Display 200 in FIG. 2A may further comprise a voltage source 222. Voltage source 222 may be used to apply a bias across the gap formed by the front sheet 202 and rear support sheet 214 to electrophoretically move at least one particle 220. Source 222 may be used to apply a positive or negative bias at the front 210 or rear electrode layer 216. The bias may be applied in a switchable manner. That is the bias may be regularly or intermittently reversed to help with particle movement.

Display 200 may be operated as follows. If the particles 220 have a positive charge, a negative bias at the rear electrode 216 may attract one or more of the particles 220 to the rear electrode 216 as shown in FIG. 2A (in other embodiments the particles may have a negative charge). Light rays may pass through the low index of refraction transparent sheet 202 where the rays may be incident on the textured surface 208 at the interface with low refractive index medium 218. The light rays may interact in multiple ways. Light rays may be totally internally reflected. This is represented by incident light ray 224. Ray 224 may be totally internally reflected and exit the display as reflected light ray 226 towards viewer 206.

A portion of some incident light rays may pass through the front sheet 202 in display 200 while another portion may be Fresnel reflected. Some light rays may be incident at angles that are smaller than the critical angle required for TIR or may also be close to the critical angle. This is exhibited by representative incident light ray 228 in FIG. 2A. A portion of ray 228 passes through sheet 202 which is represented by ray 230. This is due to the light ray being less than the critical angle. Another portion of the incident ray 228 may be Fresnel reflected as light ray 232. The amount of Fresnel reflections may increase when incident light rays are closer to the critical angle. The reflected light from a randomly or semi-randomly textured surface as shown in display 200 in FIG. 2A may appear substantially diffused to viewer 206.

Figure 2B:
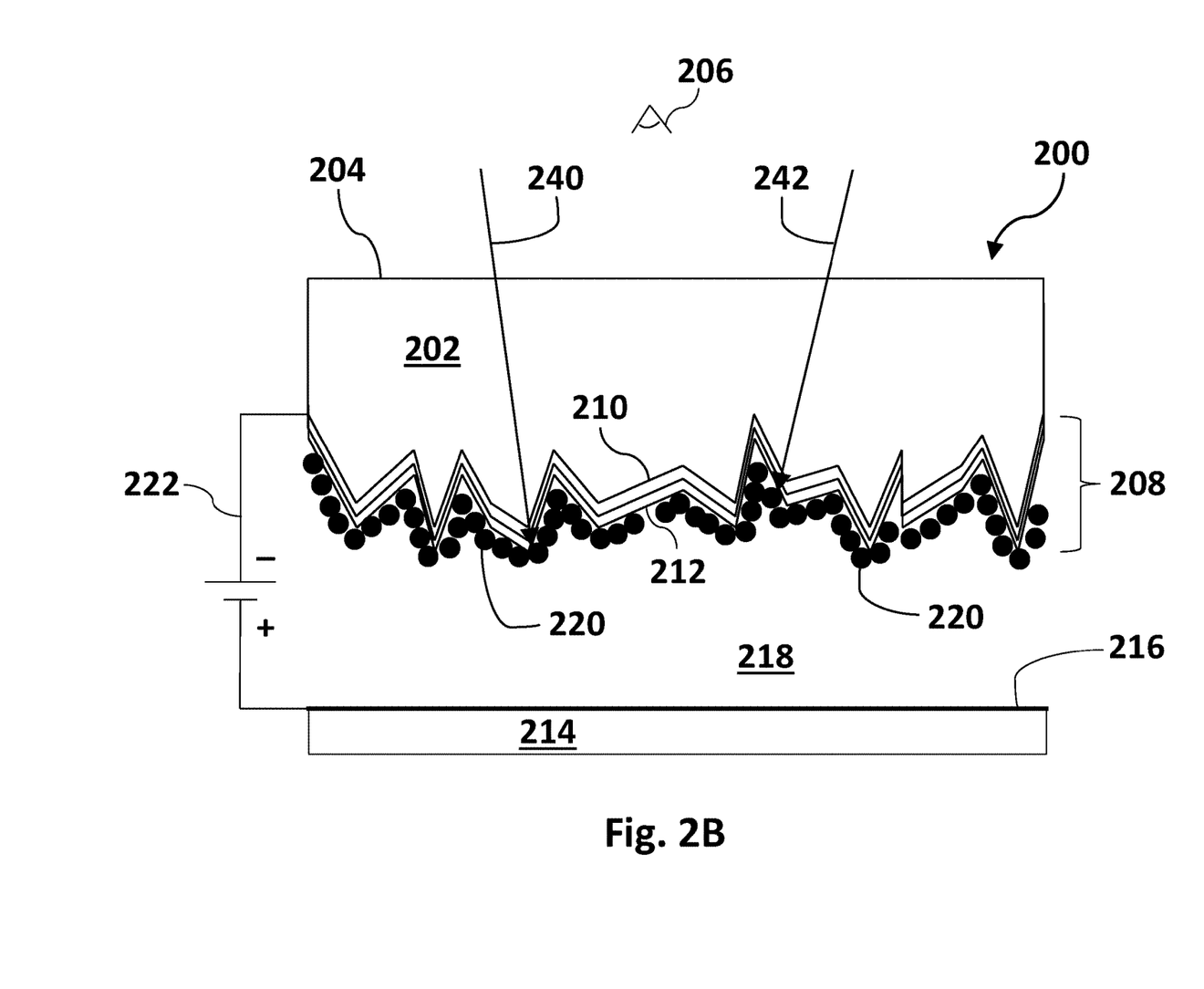
FIG. 2B is a schematic illustration of a TIR image display in the dark state having a textured front sheet.

FIG. 2B is a schematic illustration of a TIR image display in the dark state having a front sheet comprising a textured inward surface. Display 200 in FIG. 2B is the same display shown in FIG. 2A, except that display 200 of FIG. 2B is in the so-called dark state. If a bias of opposite polarity of the electrophoretically mobile particles 220 is applied at the front electrode layer 210, one or more of particles 220 may be attracted to the front electrode 210. Particles 220 may enter the evanescent wave region near the front electrode layer 210 and frustrate TIR. In this location, particles 220 may absorb incident light rays leading to a dark state. This is illustrated by representative light rays 240 and 242. Additionally, the average refractive index of the medium 218/particle 220 layer close to the surface increases due to the real part of the refractive index of the particles 220. This reduces Fresnel reflections further helping to create a dark state.

In an exemplary embodiment the dimensions of the convex protrusions and concave regions of the textured surface 206 may be of similar size to or larger than the electrophoretically mobile particles 220. This may allow for better coverage of the front electrode layer 210 in the evanescent wave region which may lead to more thorough frustration of TIR, substantial reduction or elimination of Fresnel reflections and a darker dark state. The depth of the structures, the width from structure to structure and size of the electrophoretically mobile particles may be in range of about 50 nm to about 200 nm. In other embodiments, the mobile particles may be in the range of about 80 nm to about 160 nm.

In some embodiments, at least one spacer structure may be used in combination with the display embodiments. Spacer structures may be used in order to control the gap between the front and rear electrodes. Spacer structures may be used to support the various layers in the displays. The spacer structures may be in the shape of circular or oval beads, blocks, cylinders or other geometrical shapes or combinations thereof. The spacer structures may comprise one or more of glass, metal, plastic or other resin.

In some embodiments, a color filter layer may be used in combination with the disclosed display embodiments. In an exemplary embodiment the color filter layer may be located on the outward surface of the transparent front sheet. The color filter layer may be comprised of red, green and blue filters or cyan, magenta and yellow filters.

In some embodiments, at least one edge seal may be used in combination with the display embodiments. An edge seal may be a thermally or photo-chemically cured material. The edge seal may comprise one or more of an epoxy, silicone or other polymer based material.

In some embodiments, at least one sidewall (may also be referred to as cross-walls) may be used in combination with the display embodiments. Sidewalls limit particle settling, drift and diffusion to improve display performance and bistability. Sidewalls may be located within the light modulation layer comprising the particles and medium. Sidewalls may completely or partially extend from the front electrode, rear electrode or both the front and rear electrodes. Sidewalls may comprise plastic, metal or glass or a combination thereof. Sidewalls may create wells or compartments (not shown) to confine the electrophoretically mobile particles. The sidewalls or cross-walls may be configured to create wells or compartments in, for example, square-like, triangular, pentagonal or hexagonal shapes or a combination thereof. The walls may comprise a polymeric material and patterned by conventional techniques including photolithography, embossing or molding. The walls help to confine the mobile particles to prevent settling and migration of said particles that may lead to poor display performance over time. In certain embodiments the displays may comprise cross-walls that completely bridge the gap created by the front and rear electrodes in the region where the air or liquid medium and the electrophoretically mobile particles reside. In certain embodiments, the reflective image display described herein may comprise partial cross-walls that only partially bridge the gap created by the front and rear electrodes in the region where the air or liquid medium and the mobile particles reside. In certain embodiments, the reflective image displays described herein may further comprise a combination of cross-walls and partial cross-walls that may completely and partially bridge the gap created by the front and rear electrodes in the region where the medium and the electrophoretically mobile particles reside.

In some embodiments, a directional front light may be used in combination with the display embodiments. The directional front light system may include a light source, light guide and an array of light extractor elements on the outward surface of the front sheet in each display. The directional light system may be positioned between the outward surface of the front sheet and the viewer. The front light source may define a light emitting diode (LED), cold cathode fluorescent lamp (CCFL) or a surface mount technology (SMT) incandescent lamp. The light guide may be configured to direct light to the front entire surface of the transparent outer sheet while the light extractor elements direct the light in a perpendicular direction within a narrow angle, for example, centered about a 30° cone, towards the front sheet. A directional front light system may be used in combination with cross-walls or a color filter layer in the display architectures described herein or a combination thereof.

In some embodiments, a porous reflective layer may be used in combination with the display embodiments. The porous reflective layer may be interposed between the front and rear electrode layers. In other embodiments the rear electrode may be located on the surface of the porous electrode layer.

Various control mechanisms for the invention may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); semi-random access memory (RAM); magnetic disk storage media; optical storage media; a flash memory, etc.

In some embodiments, a tangible machine-readable non-transitory storage medium that contains instructions may be used in combination with the display embodiments. In other embodiments the tangible machine-readable non-transitory storage medium may be further used in combination with one or more processors.

Figure 3:
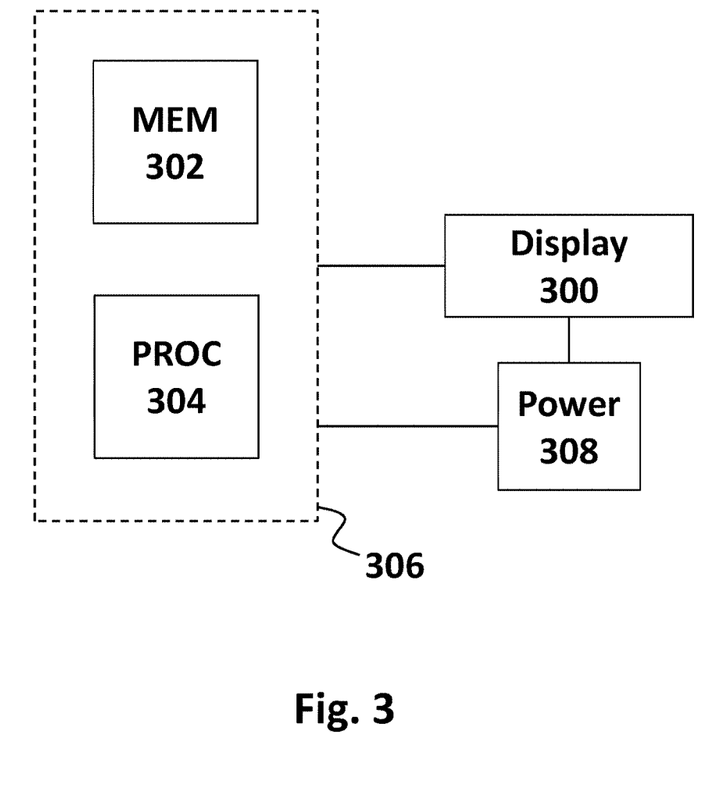
FIG. 3 shows an exemplary system for controlling a display according to one embodiment of the disclosure.

FIG. 3 shows an exemplary system for controlling a display according to one embodiment of the disclosure. In FIG. 3, display 300 is controlled by controller 306 having processor 304 and memory 302. Other control mechanisms and/or devices may be included in controller 306 without departing from the disclosed principles. Controller 306 may define hardware, software or a combination of hardware and software. For example, controller 306 may define a processor programmed with instructions (e.g., firmware). Processor 304 may be an actual processor or a virtual processor. Similarly, memory 302 may be an actual memory (i.e., hardware) or virtual memory (i.e., software).

Memory 302 may store instructions to be executed by processor 304 for driving display 300. The instructions may be configured to operate display 300. In one embodiment, the instructions may include biasing electrodes associated with display 300 (not shown) through power supply 308. When biased, the electrodes may cause movement of electrophoretic particles to a region proximal to the front electrode layer 210 (e.g., layer 210, FIGS. 2A-B) to thereby absorb or reflect light. By appropriately biasing the electrodes (not shown), mobile light absorbing particles (e.g., particles 220, FIGS. 2A-B) may be summoned to a location at or near the rear electrode layer (e.g., layer 216, FIGS. 2A-B) in order to totally internally reflect the incoming light and create a bright state.

The exemplary displays disclosed herein may be used as electronic book readers, portable computers, tablet computers, cellular telephones, smart cards, signs, watches, wearables, shelf labels, flash drives and outdoor billboards or outdoor signs comprising a display. The displays may be powered by one or more of a battery, solar cell, wind, electrical generator, electrical outlet, AC power, DC power or other means.

The following exemplary and non-limiting embodiments provide various implementations of the disclosure. Example 1 is directed to a display front sheet, comprising: a transparent layer having a first surface and a second surface, the first surface of the transparent layer having a plurality of microstructures protruding away from a first surface of the transparent layer; an electrode layer conformally disposed over the first surface of the transparent layer; a dielectric layer conformally disposed over the electrode layer.

Example 2 is directed to the display front sheet of example 1, wherein the plurality of microstructures are arranged randomly throughout at least a surface of the dielectric layer.

Example 3 is directed to the display front sheet of any preceding example, wherein the plurality of microstructures are arranged orderly throughout at least a surface of the dielectric layer.

Example 4 is directed to the display front sheet of any preceding example, wherein the plurality of microstructures include sharp concave and convex protrusions that extend towards or away from the front electrode.

Example 5 is directed to the display front sheet of any preceding example, wherein at least one of the concave protrusions is in the range of about 50-200 nm long.

Example 6 is directed to the display front sheet of any preceding example, wherein at least one of the concave protrusions is in the range of about 80-160 nm wide.

Example 7 is directed to the display front sheet of any preceding example, wherein the electrode layer comprises a transparent electrode layer.

Example 8 is directed to a reflective image display, comprising: a transparent layer having a first surface and a second surface, the first surface of the transparent layer having a plurality of randomly shaped microstructures protruding away from a first surface of the transparent layer; a substantially transparent front electrode layer positioned over the transparent layer; a dielectric layer disposed over the front electrode layer; a rear electrode positioned across the dielectric layer and forming a gap therebetween; and a plurality of electrophoretically mobile particles disposed in the gap; wherein at least some of the electrophoretically mobile particles move toward the front electrode when one or more of the front electrode or the rear electrode is biased.

Example 9 is directed to the retro-reflective display of example 8, wherein the front electrode is conformally disposed over the microstructures of the transparent layer.

Example 10 is directed to the retro-reflective display of any preceding example, wherein the dielectric layer is conformally disposed over the front electrode.

Example 11 is directed to the retro-reflective display of any preceding example, wherein the plurality of microstructures are arranged randomly throughout at least a surface of the dielectric layer.

Example 12 is directed to the retro-reflective display of any preceding example, wherein the plurality of microstructures are arranged orderly throughout at least a surface of the dielectric layer.

Example 13 is directed to the retro-reflective display of any preceding example, wherein the plurality of microstructures include sharp concave and convex protrusions which extend towards or away from the rear electrode.

Example 14 is directed to the retro-reflective display of any preceding example, wherein at least one of the concave protrusions is in the range of about 50-200 nm long.

Example 15 is directed to the retro-reflective display of any preceding example, wherein at least one of the concave protrusions is about 80-160 nm wide.

Example 16 is directed to the retro-reflective display of any preceding example, wherein the dielectric layer defines a conformal coating over the electrode layer.

Example 17 is directed to the retro-reflective display of any preceding example, further comprising a bias source coupled to each of the front and the rear electrode, the bias source configured to switchably communicate one or more biases to one or more of the front electrode and the rear electrode.

Example 18 is directed to a method to operate a reflective display, the method comprising: conformally overlaying a dielectric layer over a front electrode layer and a transparent layer, the transparent layer including a plurality of microstructures sharply protruding therefrom; positioning a rear electrode across from the dielectric layer to form a gap between the rear electrode and the dielectric layer; suspending a plurality of electrophoretically mobile particles in the gap formed between the dielectric layer and the rear electrode; biasing the front electrode relative to the rear electrode at a first level to attract at least some of the plurality of electrophoretically mobile particles toward the front electrode; and biasing the front electrode relative to the rear electrode at a second level to attract at least some of the plurality of electrophoretically mobile particles toward the rear electrode.

Example 19 is directed to the method of any preceding example, wherein the dielectric layer is conformally disposed over the front electrode layer.

Example 20 is directed to the method of any preceding example, wherein the front electrode is conformally disposed over the transparent layer.

Example 21 is directed to the method of any preceding example, wherein the plurality of microstructures are arranged randomly throughout at least a surface of the dielectric layer.

Example 22 is directed to the method of any preceding example, wherein the plurality of microstructures are arranged orderly throughout at least a surface of the dielectric layer.

Example 23 is directed to the method of any preceding example, wherein the plurality of microstructures include sharp concave and convex protrusions which extend towards or away from the rear electrode.

Example 24 is directed to the method of any preceding example, wherein at least one of the concave protrusions is in the range of about 50-200 nm long.

Example 25 is directed to the method of any preceding example, wherein at least one of the concave protrusions is about 80-160 nm wide.

Example 26 is directed to a display front sheet, comprising: a transparent layer; an electrode layer disposed adjacent the transparent layer; a dielectric layer disposed over the electrode layer, the dielectric layer further comprising a plurality of microstructures protruding away from the transparent layer away from the electrode layer.

Example 27 is directed to the display front sheet of example 26, wherein the plurality of microstructures are arranged randomly throughout at least a surface of the dielectric layer.

Example 28 is directed to the display front sheet of any preceding example, wherein the plurality of microstructures are arranged orderly throughout at least a surface of the dielectric layer.

While the principles of the disclosure have been illustrated in relation to the exemplary embodiments shown herein, the principles of the disclosure are not limited thereto and include any modification, variation or permutation thereof.

What is claimed is:
1. A reflective image display, comprising:
a transparent layer having a first surface and a second surface, the first surface of the transparent layer having a plurality of randomly shaped microstructures protruding away from a first surface of the transparent layer;
a substantially transparent front electrode layer positioned over the transparent layer;
a dielectric layer disposed over the front electrode layer;
a rear electrode positioned across the dielectric layer and forming a gap therebetween; and
a plurality of electrophoretically mobile particles disposed in the gap; wherein at least some of the electrophoretically mobile particles move toward the front electrode when one or more of the front electrodes or the rear electrode is biased
wherein at least one of the randomly shaped microstructures is different from at least one other randomly shaped microstructure.

2. The retro-reflective display of claim 1, wherein the front electrode is conformally disposed over the microstructures of the transparent layer.

3. The retro-reflective display of claim 1, wherein the dielectric layer is conformally disposed over the front electrode.

4. The retro-reflective display of claim 1, wherein the plurality of microstructures are arranged randomly throughout at least a surface of the dielectric layer.

5. The retro-reflective display of claim 1, wherein the plurality of microstructures are arranged orderly throughout at least a surface of the dielectric layer.

6. The retro-reflective display of claim 5, wherein at least one of the concave protrusions is in the range of about 50-200 nm long.

7. The retro-reflective display of claim 5, wherein at least one of the concave protrusions is about 80-160 nm wide.

8. The retro-reflective display of claim 1, wherein the plurality of microstructures include sharp concave and convex protrusions which extend towards or away from the rear electrode.

9. The retro-reflective display of claim 1, wherein the dielectric layer defines a conformal coating over the electrode layer.

10. The retro-reflective display of claim 1, further comprising a bias source coupled to each of the front and the rear electrode, the bias source configured to switchably communicate one or more biases to one or more of the front electrode and the rear electrode.

* * * * *